Nov. 15, 1932.                W. W. NELSON                1,887,657
                    VALVE FOR WIND MUSICAL INSTRUMENTS
                           Filed June 2, 1932
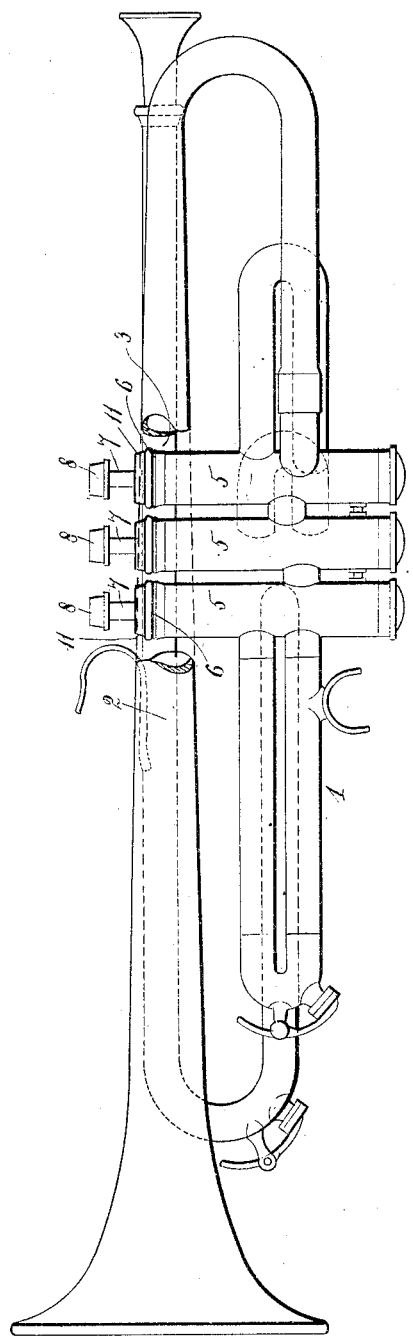
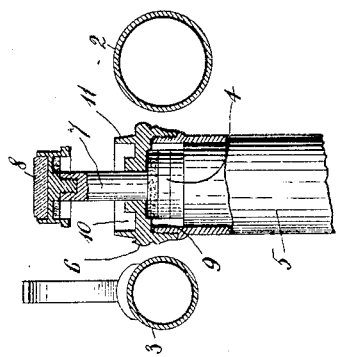
INVENTOR:
William W. Nelson
By John E. R. Hayes
ATTORNEY Patented Nov. 15, 1932

1,887,657

UNITED STATES PATENT OFFICE

WILLIAM W. NELSON, OF BROOKLINE, MASSACHUSETTS

VALVE FOR WIND MUSICAL INSTRUMENTS

Application filed June 2, 1932. Serial No. 614,933.

The invention relates to wind instruments having a series of valves with finger buttons for operating the valves, as for example in a cornet.

Heretofore the arrangement of the valves with relation to the top tubing of the instrument has been such as to raise the finger buttons so far above the top tubing as not to ensure easy and quick piston action on the part of the player. Further difficulty resides in the fact that the player instead of fingering the finger buttons with a proper vertical action, so avoiding lateral thrust upon the stems of the valves, is apt to finger the finger buttons by leaning the fingers against the sides thereof and accordingly tending to exert lateral pressure on the stems of the valves.

The purpose of the invention is to obviate the difficulties above referred to and to so arrange the finger buttons as to facilitate easy and quick piston action on the part of the player, and prevent any tendency to leaning of the fingers of the player against the finger buttons as they are operated, the finger buttons being operable only by a proper vertical movement.

The invention can best be seen and understood by reference to the drawing, in which—

Figure 1 shows an instrument in side elevation equipped with a series of valves according to the present invention, and Fig. 2 is a cross section of the top of one of the valves and top tubing lying adjacent thereto.

Referring to the drawing:—

1 represents the instrument having the usual top tubings 2 and 3. The instrument is shown equipped with a series of valves 4 arranged to reciprocate within casings 5 having threaded caps 6. The valves are provided with stems 7 extending upwardly through the caps and bearing finger buttons 8 on their top ends by which the valves are operated.

As ordinarily arranged the valve casings occupy such relative raised positions with relation to the top tubing that their threaded caps (having knurled edges) will occupy positions where they may be easily accessible from above the top tubing for turning them on or off. This elevation of the valve casing tends to bring the finger buttons into the objectionable raised position before pointed out.

According to the present invention the normal position of the finger buttons is one much nearer the top tubing than has been their normal position hitherto. This effect is obtained by lowering the valve casings 5 to a position where the tops 9 of the casings will lie below the top edges of the top tubings and preferably some little distance below, and further by providing the threaded caps 6 for the casings with sockets 10 on the tops thereof into which the finger buttons will enter when depressed, the finger grips 11 for turning said threaded caps forming the exterior of said sockets.

Having thus fully described my invention, I claim and desire to secure by Letters Patent of the United States:—

In a wind musical instrument of the type specified having a top tubing, valve casings with tops lying between said tubing and below the top edges thereof, valves within said casings, stems to the valves, and finger buttons borne by said stems, caps having threaded connection with the tops of the valve casings and provided with sockets formed in the tops thereof into which the finger buttons are received when depressed, and finger grips for turning said threaded caps forming the exterior of said sockets.

WILLIAM W. NELSON.